US012504014B2

(12) United States Patent
Sakaguchi

(10) Patent No.: US 12,504,014 B2
(45) Date of Patent: Dec. 23, 2025

(54) VACUUM PUMP

(71) Applicant: Edwards Japan Limited, Chiba (JP)

(72) Inventor: Yoshiyuki Sakaguchi, Chiba (JP)

(73) Assignee: Edwards Japan Limited, Chiba (JP)

( * ) Notice: Subject to any disclaimer, the term of this patent is extended or adjusted under 35 U.S.C. 154(b) by 102 days.

(21) Appl. No.: 18/561,819

(22) PCT Filed: Jun. 9, 2022

(86) PCT No.: PCT/JP2022/023382
§ 371 (c)(1),
(2) Date: Nov. 17, 2023

(87) PCT Pub. No.: WO2022/264925
PCT Pub. Date: Dec. 22, 2022

(65) Prior Publication Data

US 2024/0254994 A1 Aug. 1, 2024

(30) Foreign Application Priority Data

Jun. 17, 2021 (JP) ................................ 2021-100735

(51) Int. Cl.
*F04D 19/04* (2006.01)
*F04D 27/00* (2006.01)
*F04D 29/58* (2006.01)

(52) U.S. Cl.
CPC ......... *F04D 19/042* (2013.01); *F04D 27/006* (2013.01); *F04D 29/584* (2013.01); *F04D 19/048* (2013.01); *F05D 2270/303* (2013.01)

(58) Field of Classification Search
CPC ............................ F04D 19/042; F04D 29/584
See application file for complete search history.

(56) References Cited

U.S. PATENT DOCUMENTS 11,542,950 B2 1/2023 Miwata et al.
2011/0200460 A1* 8/2011 Nonaka ................ F04D 27/001 417/63
2018/0279415 A1* 9/2018 Moriyama ........... F04D 29/582

FOREIGN PATENT DOCUMENTS

JP H05216544 A 8/1993
JP H09258833 A 10/1997
(Continued)

OTHER PUBLICATIONS

PCT International Search Report dated Aug. 9, 2022 for corresponding PCT application Serial No. PCT/JP2022/023382, 2 pages.
(Continued)

*Primary Examiner* — Kenneth J Hansen
(74) *Attorney, Agent, or Firm* — Theodore M. Magee; Westman, Champlin & Koehler, P.A.

(57) ABSTRACT

To obtain a vacuum pump which appropriately performs temperature management of a gas flow path and reduces restrictions on a gas flow rate attributable to the temperature management. A cooling tube performs temperature adjustment of a gas flow path. A first temperature sensor is arranged at a position closer to the gas flow path than the cooling tube, a second temperature sensor is arranged at a position closer to the cooling tube than the gas flow path, and a control apparatus controls, based on a sensor signal of the first temperature sensor and a sensor signal of the second temperature sensor, (an on-off valve of) the cooling tube so that a temperature of the gas flow path approaches a predetermined gas flow path target temperature.

2 Claims, 6 Drawing Sheets

(56) References Cited

FOREIGN PATENT DOCUMENTS

| | | | |
|---|---|---|---|
| JP | 2001183268 | A | 7/2001 |
| JP | 2015031153 | A | 2/2015 |
| WO | 2011021428 | A1 | 2/2011 |

OTHER PUBLICATIONS

PCT International Written Opinion dated Aug. 9, 2022 for corresponding PCT application Serial No. PCT/JP2022/023382, 4 pages.

European Communication dated Apr. 25, 2025 for corresponding European application Serial No. 22824915.7, 3 pages.

European Supplementary Search Report dated Apr. 16, 2025 for corresponding European application Serial No. 22824915.7, 1 page.

* cited by examiner

VACUUM PUMP

CROSS-REFERENCE OF RELATED APPLICATION

This application is a Section 371 National Stage Application of International Application No. PCT/JP2022/023382, filed Jun. 9, 2022, which is incorporated by reference in its entirety and published as WO 2022/264925A1 on Dec. 22, 2022 and which claims priority of Japanese Application No. 2021-100735, filed Jun. 17, 2021.

FIELD

The present invention relates to a vacuum pump.

BACKGROUND

Generally, a vacuum pump is provided with a cooling means or a heating means in order to suppress a rise in temperature of a rotor portion, adjust temperature of a gas flow path, or the like. A given vacuum pump is provided with a plurality of temperature sensors and controls at least one of a cooling means and a heating means based on sensor signals output from the plurality of temperature sensors. In the vacuum pump, a temperature sensor is installed in each of a base portion and a motor portion and, based on sensor signals, a cooling water solenoid valve is opened and a heater is turned on and off.

The discussion above is merely provided for general background information and is not intended to be used as an aid in determining the scope of the claimed subject matter. The claimed subject matter is not limited to implementations that solve any or all disadvantages noted in the background.

SUMMARY OF INVENTION

In a vacuum pump, usually, a temperature sensor is installed in a vicinity of a gas flow path to be a temperature control object or in a vicinity of a cooling means or a heating means, and the cooling means or the heating means is controlled in accordance with a sensor signal from the temperature sensor.

Generally, a gas flow rate in a gas flow path of a vacuum pump fluctuates due to a process on an upstream side of the vacuum pump and a gas flow path temperature inside the vacuum pump rises when a gas flow rate which is exhausted by the vacuum pump increases but the gas flow path temperature inside the vacuum pump drops when the gas flow rate which is exhausted by the vacuum pump decreases. Therefore, even when a gas flow rate changes, a gas flow path temperature during an operation of the vacuum pump must be adjusted to within a permissible range from a lower limit value at which a gas precipitate is not created to an upper limit with respect to thermal expansion of a rotor portion.

When the temperature sensor described above is installed in a vicinity of a gas flow path to be a temperature control object, since a distance (a distance along a heat flow path) from the cooling means or the heating means to the temperature sensor increases, a longer time is required for a temperature change of the cooling means or the heating means which is performed when temperature measured by the temperature sensor changes in accordance with a change in the gas flow rate to be transmitted to the temperature sensor, an overshoot or an undershoot more readily occurs in the temperature at an installation location of the temperature sensor and, furthermore, in the temperature of the gas flow path. Therefore, in this case, since the gas flow path temperature less readily converges to a target temperature, a gas flow rate which can be exhausted by the vacuum pump in a stable manner in order to set the gas flow path temperature to within the permissible range is restricted.

In addition, when the temperature sensor described above is installed in a vicinity of the cooling means or the heating means, a distance (a distance along the heat flow path) from the gas flow path to the temperature sensor increases, and even though an overshoot or an undershoot at an installation location of the temperature sensor less readily occurs, a temperature error (in other words, a difference between an actual gas flow path temperature and a temperature measured by the temperature sensor) due to temperature control increases and, the larger the gas flow rate, the larger the temperature error. Therefore, in this case, since a measurement error of the gas flow path temperature relative to the target temperature changes in accordance with a gas flow rate, a gas flow rate which can be exhausted by the vacuum pump in a stable manner in order to set the gas flow path temperature to within the permissible range is similarly restricted.

As described above, depending on characteristics of a temperature measuring system, a gas flow rate which can be exhausted by the vacuum pump in a stable manner is restricted.

An object of the present invention is to obtain a vacuum pump which appropriately performs temperature management of a gas flow path and reduces restrictions on a gas flow rate attributable to the temperature management.

A vacuum pump according to the present invention is a vacuum pump which exhausts gas sucked in by a rotation of a rotor, the vacuum pump including: a temperature adjusting means which performs temperature adjustment of a gas flow path; a first temperature sensor arranged at a position closer to the gas flow path than the temperature adjusting means; a second temperature sensor arranged at a position closer to the temperature adjusting means than the gas flow path; and a control apparatus which controls the temperature adjusting means based on a sensor signal of the first temperature sensor and a sensor signal of the second temperature sensor so that a temperature of the gas flow path approaches a predetermined gas flow path target temperature.

According to the present invention, a vacuum pump which appropriately performs temperature management of a gas flow path and reduces restrictions on a gas flow rate attributable to the temperature management is obtained.

These and other objects, features, and advantages of the present invention will become more apparent from the following detailed description when considered together with the accompanying drawings.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DETAILED DESCRIPTION

Hereinafter, embodiments of the present invention will be described with reference to the drawings.

First Embodiment

Figure 1:
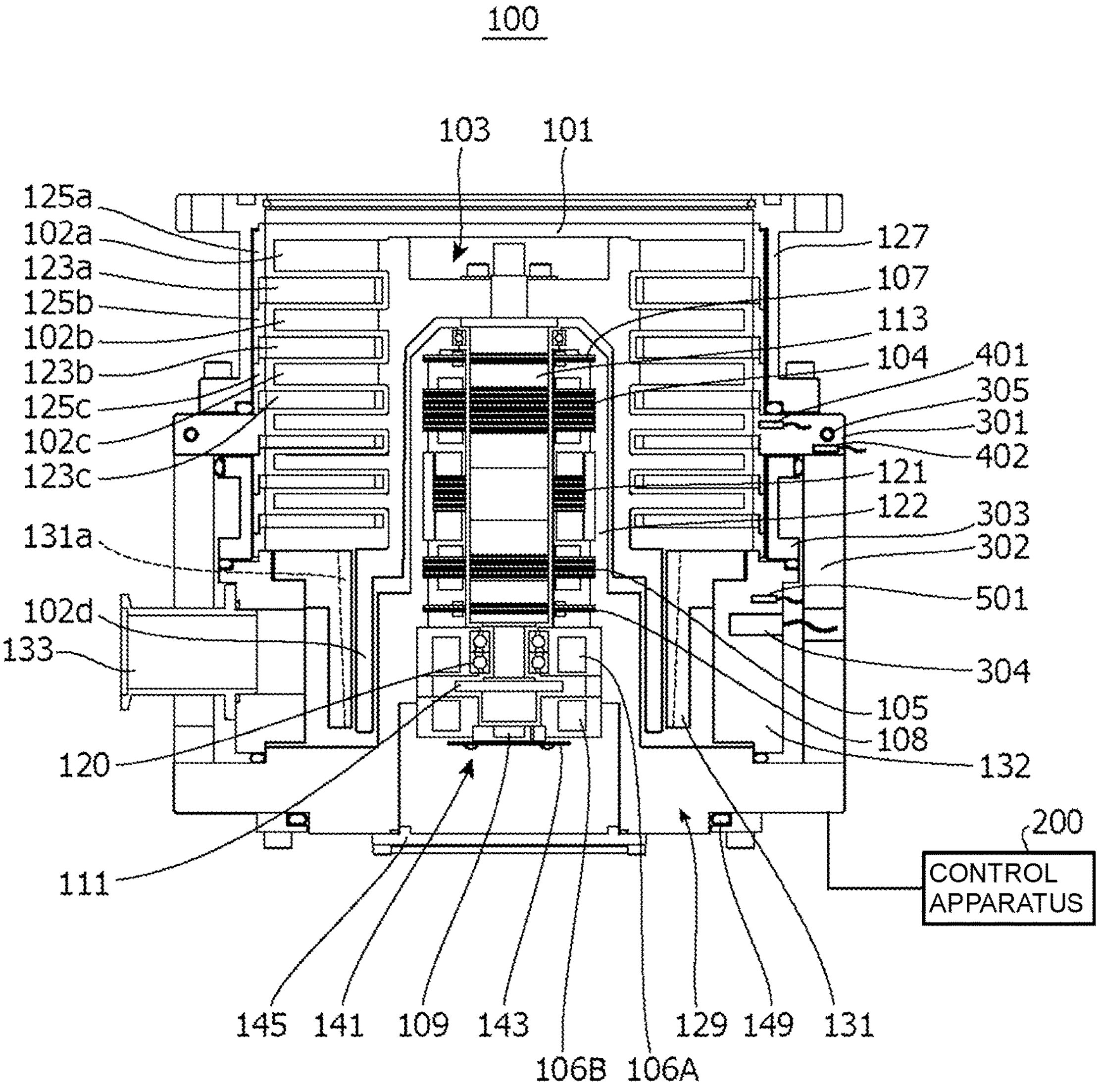
FIG. 1 is a vertical sectional view showing a turbomolecular pump as a vacuum pump according to a first embodiment of the present invention.

A vertical sectional view of the turbo-molecular pump 100 is shown in FIG. 1. In FIG. 1, an inlet port 101 is formed at an upper end of a cylindrical outer cylinder 127 of the turbo-molecular pump 100. In addition, a rotating body 103 in which a plurality of rotor blades 102 (102*a*, 102*b*, 102*c*, . . . ) being turbine blades for sucking and exhausting gas are radially formed in multiple stages in a circumferential portion is provided inside the outer cylinder 127. A rotor shaft 113 is mounted to the center of the rotating body 103 and, for example, a five-axis control magnetic bearing levitates and supports the rotor shaft 113 in midair and controls a position of the rotor shaft 113. Generally, the rotating body 103 is constituted of a metal such as aluminum or an aluminum alloy.

Four upper radial direction electromagnets 104 are arranged so as to form pairs along X and Y axes. Four upper radial direction sensors 107 are provided in proximity to the upper radial direction electromagnets 104 and in correspondence with each of the upper radial direction electromagnets 104. For example, an inductance sensor, an eddy current sensor, or the like having conducting winding is used as the upper radial direction sensors 107 and, based on a change in inductance of the conducting winding which changes in accordance with a position of the rotor shaft 113, the upper radial direction sensors 107 detect the position of the rotor shaft 113. The upper radial direction sensors 107 are configured to detect a radial direction displacement of the rotor shaft 113 or, more specifically, a radial direction displacement of the rotating body 103 being fixed to the rotor shaft 113, and to send the detected radial direction displacement to a control apparatus 200.

In this control apparatus 200, for example, a compensation circuit having a PID adjustment function generates an excitation control command signal of the upper radial direction electromagnet 104 based on a position signal detected by an upper radial direction sensor 107, and an amplifier circuit 150 (to be described later) shown in FIG. 2 controls excitation of the upper radial direction electromagnet 104 based on the excitation control command signal to adjust an upper radial direction position of the rotor shaft 113.

In addition, the rotor shaft 113 is formed of a high magnetic permeability material (such as iron or stainless steel) or the like and is configured so as to be attracted by a magnetic force of the upper radial direction electromagnet 104. The adjustment described above is respectively independently performed in an X axis direction and a Y axis direction. In addition, lower radial direction electromagnets 105 and lower radial direction sensors 108 are arranged in a similar manner to the upper radial direction electromagnets 104 and the upper radial direction sensors 107 and adjust a position in the radial direction of a lower side of the rotor shaft 113 in a similar manner to the position in the radial direction of the upper side.

Furthermore, the axial direction electromagnets 106A, 106B are arranged so as to vertically sandwich a disc-shaped metal disc 111 provided in a lower part of the rotor shaft 113. The metal disc 111 is constituted by a high magnetic permeability material such as iron. An axial direction sensor 109 is provided in order to detect an axial displacement of the rotor shaft 113, and the axial direction sensor 109 is configured such that an axial direction position signal thereof is sent to the control apparatus 200.

In the control apparatus 200, for example, the compensation circuit having the PID adjustment function generates an excitation control command signal of each of the axial direction electromagnet 106A and the axial direction electromagnet 106B based on an axial direction position signal detected by the axial direction sensor 109, and as the amplifier circuit 150 controls excitation of each of the axial direction electromagnet 106A and the axial direction electromagnet 106B based on the excitation control command signals, the axial direction electromagnet 106A attracts the metal disc 111 upward using magnetic force and the axial direction electromagnet 106B attracts the metal disc 111 downward to adjust an axial direction position of the rotor shaft 113.

In this manner, the control apparatus 200 is configured to appropriately adjust magnetic forces exerted on the metal disc 111 by the axial direction electromagnets 106A and 106B to magnetically levitate the rotor shaft 113 in the axial direction and hold the rotor shaft 113 in space in a contactless manner. The amplifier circuit 150 which controls excitation of the upper radial direction electromagnets 104, the lower radial direction electromagnets 105, and the axial direction electromagnets 106A and 106B will be described later.

On the other hand, a motor 121 includes a plurality of magnetic poles which are circumferentially arranged so as to surround the rotor shaft 113. Each magnetic pole is controlled by the control apparatus 200 so as to rotationally drive the rotor shaft 113 via an electromagnetic force which acts between the magnetic pole and the rotor shaft 113. In addition, the motor 121 has a built-in rotation velocity sensor (not illustrated) such as a Hall element, a resolver, or an encoder, and a rotation velocity of the rotor shaft 113 is to be detected based on a detection signal of the rotation velocity sensor.

Furthermore, a phase sensor (not illustrated) is mounted in, for example, a vicinity of the lower radial direction sensors 108 and the phase sensor is configured to detect a phase of rotation of the rotor shaft 113. The control apparatus 200 is configured to detect a position of a magnetic pole using both detection signals of the phase sensor and the rotation velocity sensor.

A plurality of stator blades 123 (123*a*, 123*b*, 123*c*, . . . ) are disposed across small gaps from the rotor blades 102 (102*a*, 102*b*, 102*c*, . . . ). The rotor blades 102 (102*a*, 102*b*, 102*c*, . . . ) are formed inclined by a prescribed angle relative to a plane perpendicular to an axial line of the rotor shaft 113 in order to respectively transport a molecule of exhaust gas downward due to a collision of the exhaust gas. The stator blades 123 (123*a*, 123*b*, 123*c*, . . . ) are constituted by, for example, a metal such as aluminum, iron, stainless steel, or copper or a metal such as an alloy containing these metals as components.

In addition, the stator blade 123 is also formed inclined by a prescribed angle relative to a plane perpendicular to the axial line of the rotor shaft 113 and is disposed so as to alternate with the stages of the rotor blade 102 toward inside of the outer cylinder 127. Furthermore, an outer peripheral end of the stator blade 123 is supported in a state of being fitted and inserted between a plurality of stacked stator blade spacers 125 (125*a*, 125*b*, 125*c*, . . . ).

The stator blade spacer 125 is a ring-shaped member constituted by, for example, a metal such as aluminum, iron, stainless steel, or copper or a metal such as an alloy containing these metals as components. The outer cylinder 127, an annular member 301, and an outer cylindrical member 302 are fixed across a gap in an outer circumference of the stator blade spacer 125. A base portion 129 is disposed in a bottom portion of the outer cylindrical member 302. In addition, an outlet port 133 is arranged above the base portion 129 and is communicated with the outside. Exhaust gas having entered the inlet port 101 from a side of a chamber (a vacuum chamber) and having been transported to the base portion 129 is sent to the outlet port 133.

Furthermore, depending on the application of the turbo-molecular pump 100, a threaded spacer 131 is disposed between a lower portion of the stator blade spacer 125 and the base portion 129. The threaded spacer 131 is a cylindrical member constituted by a metal such as aluminum, copper, stainless steel, or iron or a metal such as an alloy containing these metals as components, and a thread groove 131*a* with a spiral shape is engraved in plurality on an inner circumferential surface of the threaded spacer 131. A direction of the spirals of the thread grooves 131*a* is a direction in which, when a molecule of exhaust gas moves in a direction of rotation of the rotating body 103, the molecule is transported toward the outlet port 133. A cylindrical portion 102*d* is suspended from a lowermost portion which continues from the rotor blades 102 (102*a*, 102*b*, 102*c*, . . . ) of the rotating body 103. An outer circumferential surface of the cylindrical portion 102*d* is cylindrical in shape and overhangs toward the inner circumferential surface of the threaded spacer 131, and is in proximity to the inner circumferential surface of the threaded spacer 131 across a prescribed gap. The exhaust gas transported to the thread grooves 131*a* by the rotor blades 102 and the stator blades 123 is sent to the base portion 129 while being guided by the thread grooves 131*a*.

The base portion 129 is a disc-shaped member constituting a base of the turbo-molecular pump 100 and is generally constituted by a metal such as iron, aluminum, or stainless steel. Since the base portion 129 physically holds the turbo-molecular pump 100 and also has a function of a heat conductive path, a metal having both rigidity and high thermal conductivity such as iron, aluminum, or copper is desirably used.

In the configuration described above, when the rotor blade 102 is rotationally driven together with the rotor shaft 113 by the motor 121, exhaust gas from the chamber is sucked through the inlet port 101 due to actions of the rotor blade 102 and the stator blade 123. A rotation velocity of the rotor blade 102 normally ranges from 20,000 rpm to 90,000 rpm and a peripheral velocity at a tip of the rotor blade 102 reaches 200 m/s to 400 m/s. The exhaust gas sucked from the inlet port 101 passes between the rotor blade 102 and the stator blade 123 and is transported to the base portion 129. At this point, while a temperature of the rotor blade 102 rises due to frictional heat generated when the exhaust gas comes into contact with the rotor blade 102, conduction of heat generated in the motor 121, or the like, this heat is transferred to the side of the stator blade 123 by radiation, conduction by a gas molecule of the exhaust gas, or the like.

The stator blade spacers 125 the stator blades 123 are joined to one another in outer peripheral portions and transfer heat received by the stator blades 123 from the rotor blades 102, frictional heat generated when the exhaust gas comes into contact with the stator blades 123, or the like to the outside.

In the description given above, the threaded spacer 131 is disposed on the outer circumference of the cylindrical portion 102*d* of the rotating body 103 and the thread grooves 131*a* are engraved on the inner circumferential surface of the threaded spacer 131. However, there may be cases where, conversely, a thread groove is engraved on the outer circumferential surface of the cylindrical portion 102*d* and a spacer having a cylindrical inner circumferential surface is arranged around the thread groove.

In addition, depending on the application of the turbo-molecular pump 100, a periphery of an electrical component portion constituted of the upper radial direction electromagnets 104, the upper radial direction sensors 107, the motor 121, the lower radial direction electromagnets 105, the lower radial direction sensors 108, the axial direction electromagnets 106A and 106B, the axial direction sensor 109, and the like may be covered by a stator column 122 in order to prevent gas sucked in from the inlet port 101 from penetrating into the electrical component portion and, in some cases, an interior of the stator column 122 may be kept at predetermined pressure by purge gas.

In this case, piping (not illustrated) is arranged in the base portion 129 and the purge gas is introduced through the piping. The introduced purge gas is sent to the outlet port 133 through gaps between a protective bearing 120 and the rotor shaft 113, between a rotor and a stator of the motor 121, and between the stator column 122 and an inner peripheral-side cylindrical portion of the rotor blade 102.

The turbo-molecular pump 100 requires specification of a model and control based on individually adjusted unique parameters (for example, various characteristics that correspond to the model). In order to store such control parameters, the turbo-molecular pump 100 is provided with an electronic circuit portion 141 in a main body thereof. The electronic circuit portion 141 is constituted of electronic components including a semiconductor memory such as an EEP-ROM and a semiconductor device for accessing the semiconductor memory, a substrate 143 for mounting the electronic components, and the like. The electronic circuit portion 141 is housed below, for example, a rotation velocity sensor (not illustrated) near center of the base portion 129 which constitutes a lower part of the turbo-molecular pump 100 and is closed by an airtight bottom lid 145.

In a manufacturing process of a semiconductor, process gases to be introduced to a chamber include gases which become a solid when pressure thereof exceeds a predetermined value or a temperature thereof falls below a predetermined value. Pressure of exhaust gas inside the turbo-molecular pump 100 is lowest at the inlet port 101 and highest at the outlet port 133. When the pressure of a process gas exceeds a predetermined value or the temperature of the process gas falls below a predetermined value while the process gas is being transferred from the inlet port 101 to the outlet port 133, the process gas assumes a solid state and adheres to the inside of the turbo-molecular pump 100 and becomes deposited thereon.

For example, when $SiCl_4$ is used as a process gas in an AL etching apparatus, a vapor pressure curve reveals that, at low vacuum (760 [torr] to $10^{-2}$ [torr]) and low temperature (approximately 20 [° C.]), deposition of a solid product (for example, $AlCl_3$) occurs and the solid product adheres to and becomes deposited on the inside of the turbo-molecular pump 100. Accordingly, when a deposit of a process gas accumulates inside the turbo-molecular pump 100, the deposit may narrow a pump flow path and cause a decline in performance of the turbo-molecular pump 100. Furthermore, the product described earlier readily solidifies and adheres in high-pressure portions near the outlet port 133 and near the threaded spacer 131.

Therefore, in order to solve this problem, conventionally, a heater (not illustrated) or an annular water-cooled tube 149 is wound around an outer periphery of the base portion 129 or the like and, for example, a temperature sensor (such as a thermistor) (not illustrated) is embedded in the base portion 129, whereby heating by the heater or cooling by the water-cooled tube 149 (hereinafter, referred to as TMS (Temperature Management System)) is controlled so as to keep the temperature of the base portion 129 at a constant high temperature (set temperature) based on a signal from the temperature sensor.

Next, regarding the turbo-molecular pump 100 configured as described above, the amplifier circuit 150 which controls excitation of the upper radial direction electromagnets 104, the lower radial direction electromagnets 105, and the axial direction electromagnets 106A and 106B will be described. FIG. 2 shows a circuit diagram of the amplifier circuit 150.

Figure 2:
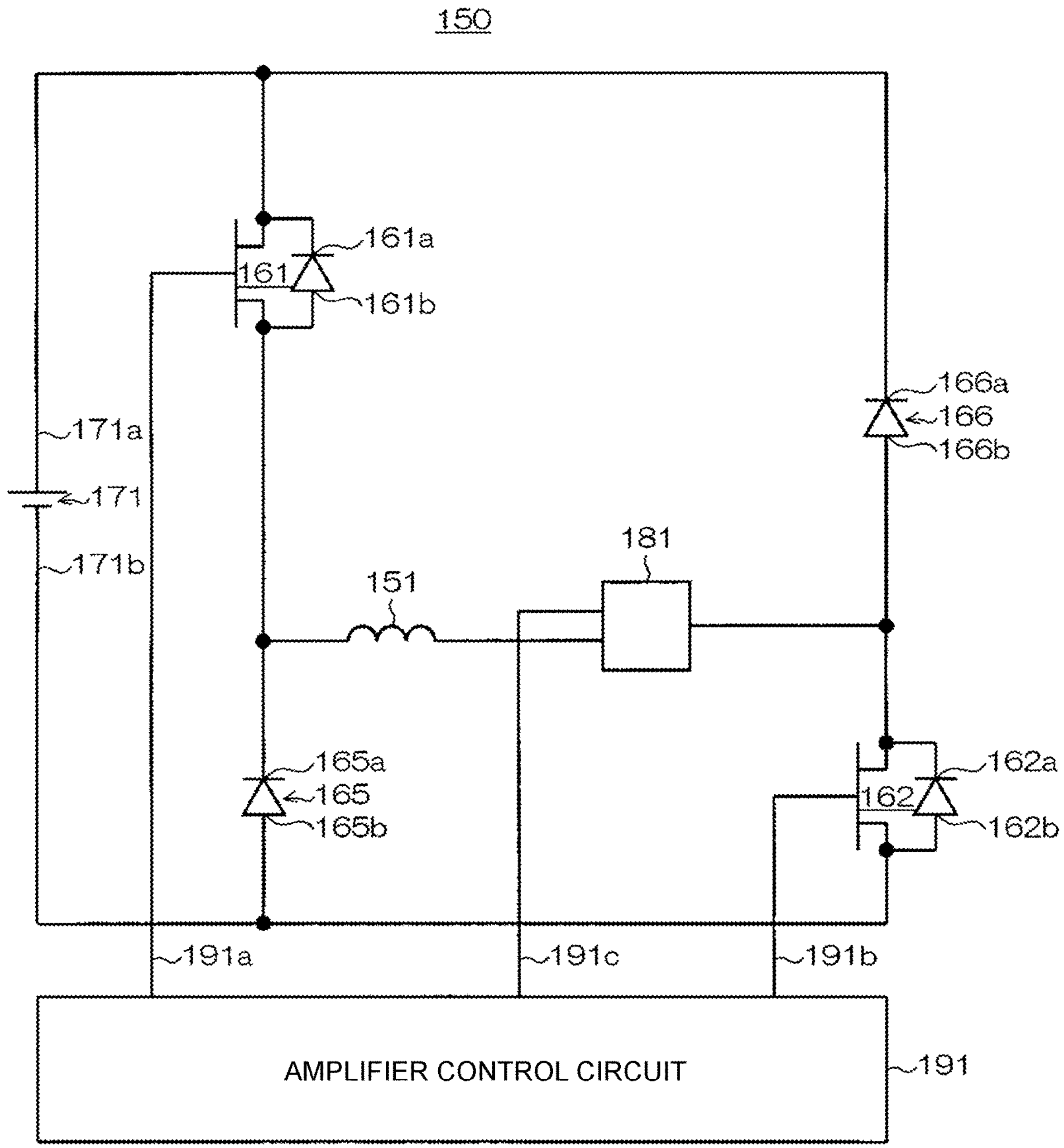
FIG. 2 is a circuit diagram showing an amplifier circuit which controls excitation of an electromagnet of the turbomolecular pump shown in FIG. 1.

In FIG. 2, of an electromagnet winding 151 that constitutes the upper radial direction electromagnet 104 or the like, one end is connected to a positive electrode 171*a* of a power supply 171 via a transistor 161 and another end is connected to a negative electrode 171*b* of the power supply 171 via a current detection circuit 181 and a transistor 162. In addition, the transistors 161 and 162 are so-called power MOSFETs and are structured such that a diode is connected between a source and a drain thereof.

In this case, in the transistor 161, a cathode terminal 161*a* of the diode thereof is connected to the positive electrode 171*a* and an anode terminal 161*b* is connected to the one end of the electromagnet winding 151. In addition, in the transistor 162, a cathode terminal 162*a* of the diode thereof is connected to the current detection circuit 181 and an anode terminal 162*b* is connected to the negative electrode 171*b*.

On the other hand, in a diode 165 for current regeneration, a cathode terminal 165*a* thereof is connected to the one end of the electromagnet winding 151 and an anode terminal 165*b* thereof is connected to the negative electrode 171*b*. In addition, in a similar manner, in a diode 166 for current regeneration, a cathode terminal 166*a* thereof is connected to the positive electrode 171*a* and an anode terminal 166*b* thereof is connected to the other end of the electromagnet winding 151 via the current detection circuit 181. Furthermore, for example, the current detection circuit 181 is constituted of a Hall sensor-type current sensor or an electric resistance element.

The amplifier circuit 150 configured as described above corresponds to a single electromagnet. Therefore, when a magnetic bearing is subject to five-axis control and there are a total of ten electromagnets 104, 105, 106A, and 106B, a similar amplifier circuit 150 is constructed with respect to each of the electromagnets and ten amplifier circuits 150 are to be connected in parallel to the power supply 171.

Furthermore, an amplifier control circuit 191 is constituted of, for example, a digital signal processor portion (not illustrated) (hereinafter, referred to as a DSP portion) of the control apparatus 200 and the amplifier control circuit 191 is configured to switch the transistors 161 and 162 on and off.

The amplifier control circuit 191 is configured to compare a current value detected by the current detection circuit 181 (a signal reflecting this current value is referred to as a current detection signal 191*c*) and a predetermined current command value with each other. In addition, based on a comparison result thereof, the amplifier control circuit 191 is configured to determine a magnitude of a width (pulse width times Tp1 and Tp2) of a pulse to be generated within a control cycle Ts which is a single cycle under PWM control. As a result, gate drive signals 191*a* and 191*b* having this pulse width are to be output from the amplifier control circuit 191 to gate terminals of the transistors 161 and 162.

When passing a resonance point during an accelerating operation of the rotation velocity of the rotating body 103, when a disturbance occurs during a constant-velocity operation of the rotating body 103, or the like, position control of the rotating body 103 must be performed at high velocity and with a large force. Therefore, in order to enable a current flowing through the electromagnet winding 151 to be suddenly increased (or reduced), high voltage of around 50 V is to be used as the power supply 171. In addition, normally, a capacitor (not illustrated) is connected between the positive electrode 171*a* and the negative electrode 171*b* of the power supply 171 in order to stabilize the power supply 171.

In the configuration described above, a current (hereinafter, referred to as an electromagnet current iL) which flows through the electromagnet winding 151 increases when both transistors 161 and 162 are switched on but the electromagnet current iL decreases when both transistors 161 and 162 are switched off.

In addition, when one of the transistors 161 and 162 is switched on while the other is switched off, a so-called flywheel current is maintained. Furthermore, passing the flywheel current through the amplifier circuit 150 in this manner enables hysteresis loss in the amplifier circuit 150 to be reduced and power consumption of the circuit as a whole to be kept low. Moreover, controlling the transistors 161 and 162 in this manner enables high-frequency noise such as harmonics which are created in the turbo-molecular pump 100 to be reduced. In addition, by measuring the flywheel current with the current detection circuit 181, the electromagnet current iL that flows through the electromagnet winding 151 can be detected.

Figure 3:
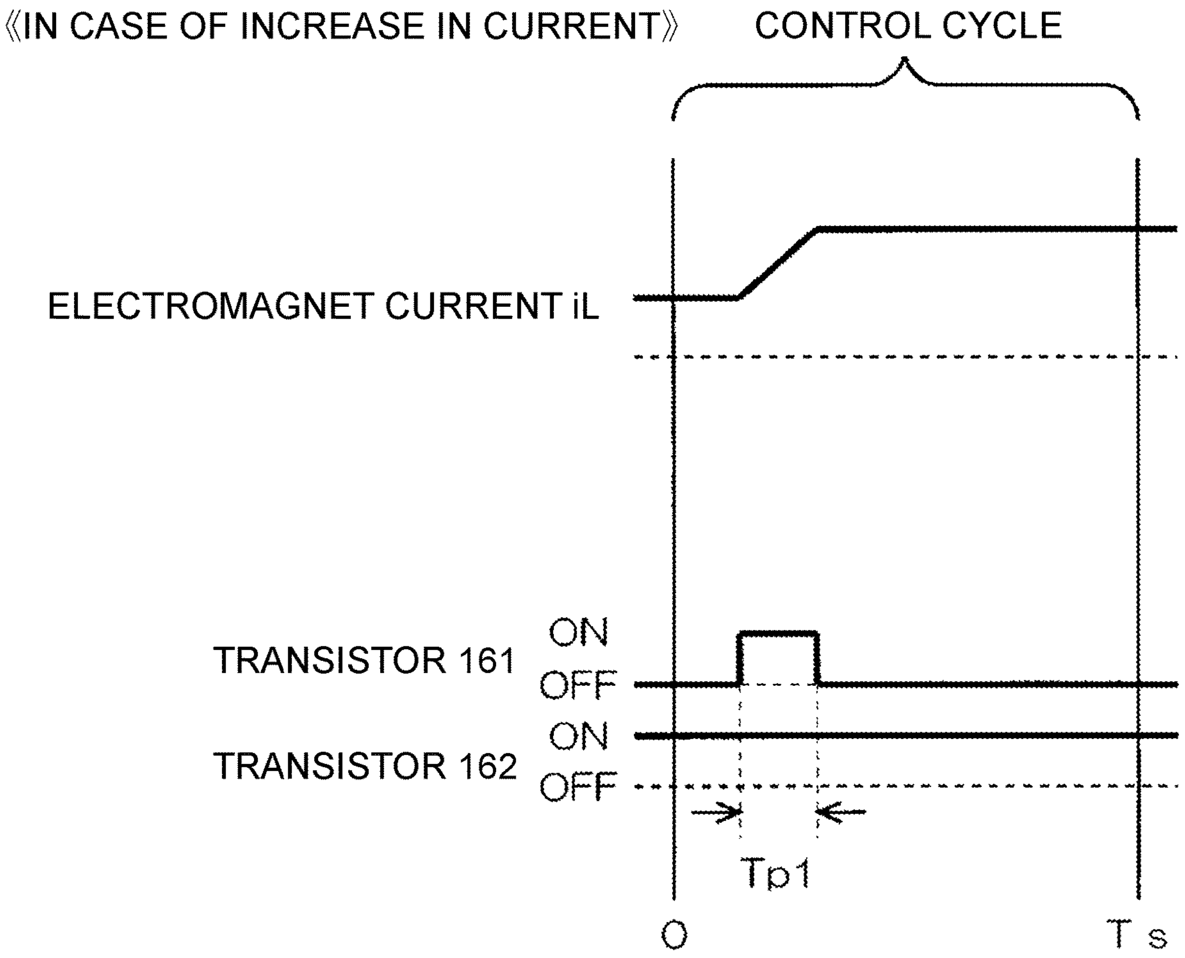
FIG. 3 is a time chart showing control when a current command value is larger than a detected value.

Specifically, when a detected current value is smaller than a current command value, both the transistors 161 and 162 are switched on for a time corresponding to a pulse width time Tp1 only once during the control cycle Ts (for example, 100 μs) as shown in FIG. 3. Therefore, the electromagnet current iL during this period increases toward a current value iLmax (not illustrated) which can be passed via the transistors 161 and 162 from the positive electrode 171*a* to the negative electrode 171*b*.

Figure 4:
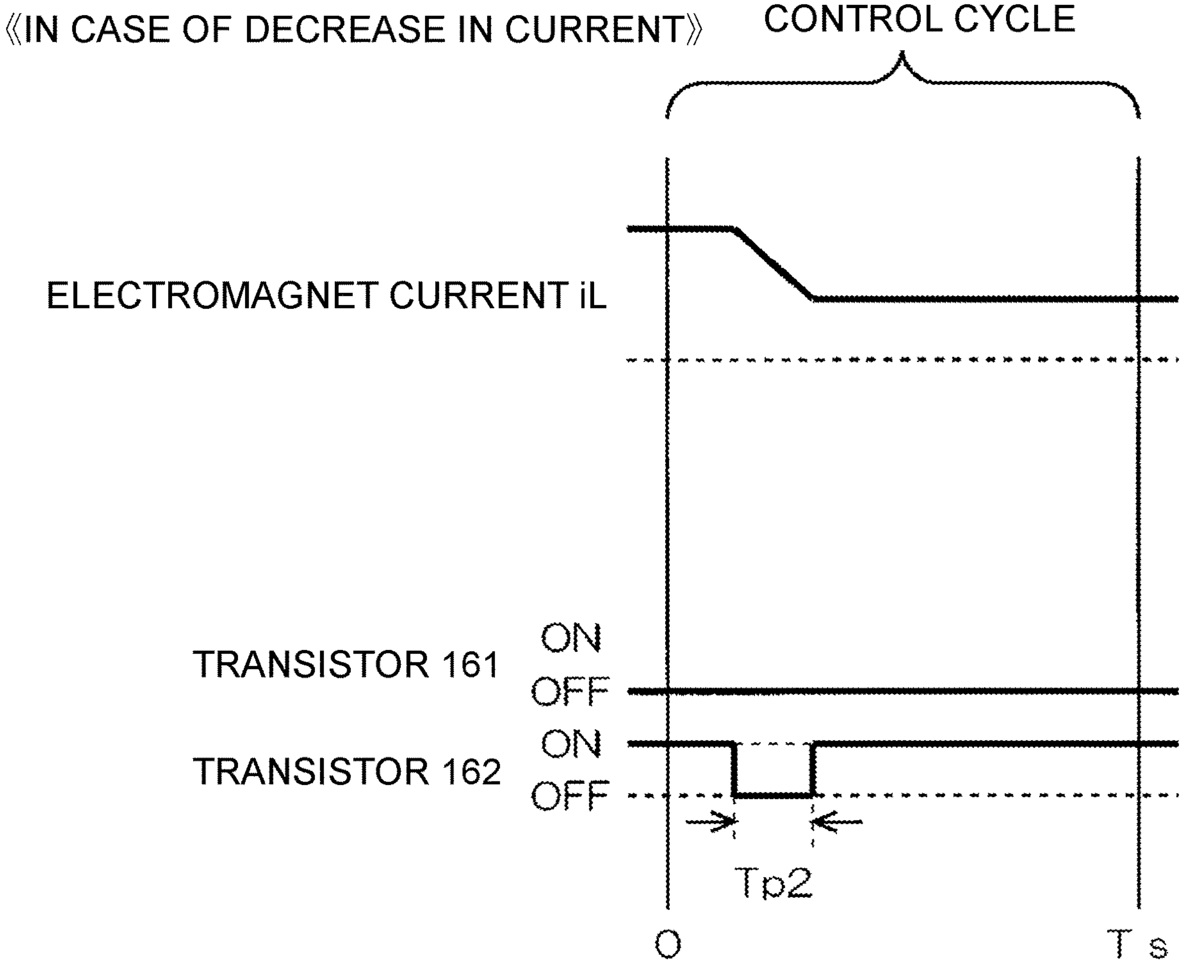
FIG. 4 is a time chart showing control when the current command value is smaller than the detected value.

On the other hand, when the detected current value is larger than the current command value, both the transistors 161 and 162 are switched off for a time corresponding to a pulse width time Tp2 only once during the control cycle Ts as shown in FIG. 4. Therefore, the electromagnet current iL during this period decreases toward a current value iLmin (not illustrated) which can be regenerated via the diodes 165 and 166 from the negative electrode 171*b* to the positive electrode 171*a*.

In addition, in both cases, any one of the transistors 161 and 162 is turned on after the pulse width times Tp1 and Tp2 elapse. Therefore, during these periods, a flywheel current is maintained in the amplifier circuit 150.

The main portions of the turbo-molecular pump 100 are configured as described above. The turbo-molecular pump 100 is an example of a vacuum pump. In addition, in FIG. 1, the rotor blade 102 and the rotating body 103 constitute a rotor of the turbo-molecular pump 100, the stator blade 123 and the stator blade spacer 125 constitute a stator portion of the turbo-molecular pump portion, and the threaded spacer 131 constitutes a stator portion of a thread groove pump portion in a stage subsequent to the turbo-molecular pump portion. Furthermore, the inlet port 101, the outlet port 133, the outer cylinder 127, the annular member 301, and the outer cylindrical member 302 constitute a casing of the turbo-molecular pump 100 and house the rotor described above and the plurality of stator portions described above. In other words, the rotor described above is rotatably held inside the casing described above, and the plurality of stator portions described above are disposed so as to oppose the rotor and have a gas compressing function. Moreover, gas sucked by a rotation of the rotor is transported along a gas flow path and exhausted from the outlet port 133.

In addition, the annular member 301 is an annular member which is one of the members laminated from the base portion 129 toward a side of the inlet port 101. The stator portion constituted by the stator blade 123 and the stator blade spacer 125 is in contact with the annular member 301 along the axial direction. Furthermore, one end of an annular member 303 is in contact with the annular member 301 and another end of the annular member 303 is in contact with the threaded spacer 131. Moreover, another end of the threaded spacer 131 is not in contact with the base portion 129.

In addition, an annular member 132 in contact with the threaded spacer 131 constituting an inner wall of the gas flow path is provided with a heater 304 as a temperature adjusting means which performs temperature adjustment of the gas flow path, and the annular member 301 constituting an inner wall of the gas flow path is provided with a cooling tube 305.

Therefore, heat flows into the threaded spacer 131 from the heater 304 via the annular member 132 and, accordingly, a temperature of the threaded spacer 131 or, in other words, a temperature of the gas flow path changes. In addition, heat flows into the cooling tube 305 from the annular member 301 and, accordingly, a temperature of the annular member 301 or, in other words, the temperature of the gas flow path changes.

Furthermore, in the first embodiment, two temperature sensors 401 and 402 are installed on the annular member 301 in correspondence to the cooling tube 305, and one temperature sensor 501 is installed on the threaded spacer 131 in correspondence to the heater 304. In other words, the heater 304 and the cooling tube 305 as temperature adjusting means are respectively provided with temperature sensors.

The temperature sensor 401 is arranged in a vicinity of the gas flow path at a position closer to the gas flow path than the cooling tube 305 as a temperature adjusting means.

The temperature sensor 402 is arranged in a vicinity of the cooling tube 305 as a temperature adjusting means at a position closer to the cooling tube 305 than the gas flow path. Specifically, the temperature sensor 402 is arranged in the vicinity of an on-off valve (solenoid valve) of the cooling tube 305.

In addition, based on a sensor signal output from the temperature sensor 401 and a sensor signal output from the temperature sensor 402, the control apparatus 200 controls on-off of the on-off valve (solenoid valve) of the cooling tube 305 so that the temperature of the gas flow path (specifically, the gas flow path in the turbo-molecular pump portion) approaches a predetermined gas flow path target temperature.

Furthermore, based on a sensor signal output from the temperature sensor 501, the control apparatus 200 controls on-off of the heater 304 so that the temperature of the gas flow path (specifically, the gas flow path in the thread groove pump portion) approaches a predetermined gas flow path target temperature.

Specifically, the control apparatus 200 causes the temperature of the gas flow path to approach a predetermined gas flow path target temperature by controlling the on-off valve (solenoid valve) of the cooling tube 305 so that a measured temperature based on a sensor signal of the temperature sensor 402 approaches a control temperature set value. In addition, the control apparatus 200 changes a control method of the cooling tube 305 based on a measured temperature at an installation position of the temperature sensor 401 based on the sensor signal of the temperature sensor 401.

For example, the control apparatus 200 changes a control method of the cooling tube 305 by specifying a measured temperature at the installation position of the temperature sensor 401 based on the sensor signal of the temperature sensor 401 and adjusting the control temperature set value based on the measured temperature.

Specifically, when the measured temperature at the installation position of the temperature sensor 401 based on the sensor signal of the temperature sensor 401 rises, the control temperature set value is reduced (as compared to a value at a present time point), and when the measured temperature at the installation position of the temperature sensor 401 based on the sensor signal of the temperature sensor 401 drops, the control temperature set value is increased (as compared to a value at a present time point).

Alternatively, for example, based on the measured temperature, the control apparatus 200 may adjust a transfer function of a temperature control system of the cooling tube 305 together with the control temperature set value described above.

Next, an operation of the vacuum pump according to the first embodiment will be described.

During an operation of the vacuum pump, the motor 121 operates and a rotor rotates based on control by the control apparatus 200. Accordingly, gas having flowed in via the inlet port 101 is transported along a gas flow path between the rotor and the stator portion and discharged to an outer pipe from the outlet port 133.

During an operation of the vacuum pump, the control apparatus 200 acquires sensor signals of the temperature sensors 401, 402, and 501 and monitors measured temperatures at installation positions of the temperature sensors 401, 402, and 501 instead of directly monitoring a gas flow rate. In addition, the control apparatus 200 performs temperature control of the gas flow path by controlling the heater 304 and the on-off valve of the cooling tube 305 (in other words, a coolant flow rate) based on the measured temperatures.

Figure 5:
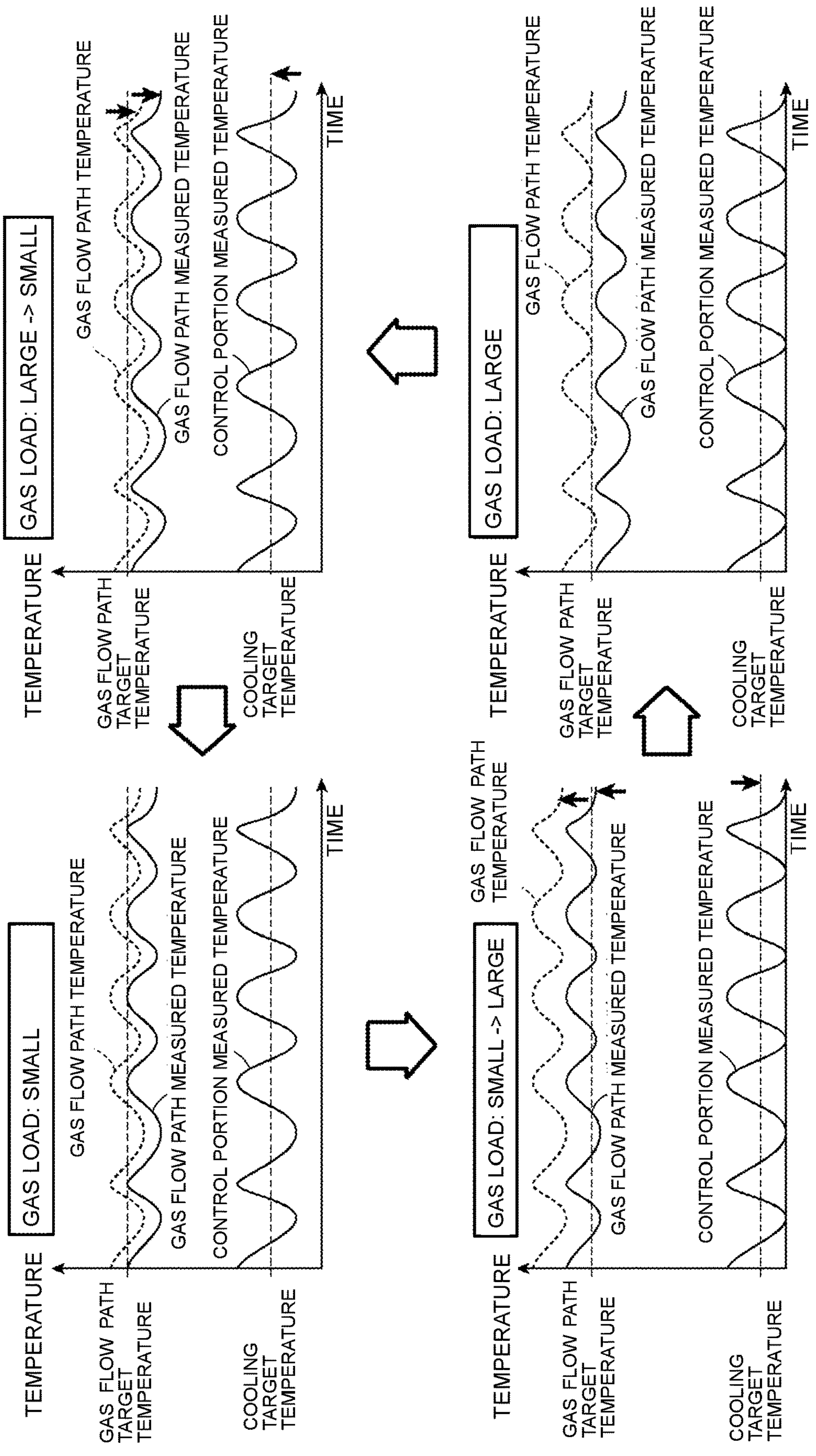
FIG. 5 is a diagram explaining temperature control of the vacuum pump shown in FIG. 1.

FIG. 5 is a diagram explaining temperature control of the vacuum pump shown in FIG. 1. Specifically, for example, as shown in FIG. 5, when a gas load (gas flow rate) is small, an actual gas flow path temperature is relatively low and the measured temperature (gas flow path measured temperature) of the temperature sensor 401 is also relatively low.

In this case, when the gas load (gas flow rate) increases, the actual gas flow path temperature rises and the measured temperature (gas flow path measured temperature) of the temperature sensor 401 also rises. Therefore, the control apparatus 200 lowers the control temperature set value of the cooling tube 305 (in other words, the cooling target temperature) by a drop amount corresponding to a rise amount of the measured temperature.

Accordingly, a temperature drop in a vicinity of the cooling tube 305 is transmitted to the gas flow path and the gas flow path temperature approaches the gas flow path target temperature.

On the other hand, when the gas load (gas flow rate) decreases, the actual gas flow path temperature drops and the measured temperature (gas flow path measured temperature) of the temperature sensor 401 also drops. Therefore, the control apparatus 200 raises the control temperature set value of the cooling tube 305 (in other words, the cooling target temperature) by a rise amount corresponding to a drop amount of the measured temperature.

Accordingly, a temperature rise in a vicinity of the cooling tube 305 is transmitted to the gas flow path and the gas flow path temperature approaches the gas flow path target temperature.

By using the two temperature sensors 401 and 402 in this manner, the gas flow path temperature is adjusted with a small temperature error so as to follow a fluctuation of a gas load (a gas flow rate).

As described above, according to the first embodiment, the cooling tube 305 performs temperature adjustment of a gas flow path. The temperature sensor 401 is arranged at a position closer to the gas flow path than the cooling tube 305, the temperature sensor 402 is arranged at a position closer to the cooling tube 305 than the gas flow path, and the control apparatus 200 controls, based on a sensor signal of the temperature sensor 401 and a sensor signal of the temperature sensor 402, (the on-off valve of) the cooling tube 305 so that a temperature of the gas flow path approaches a predetermined gas flow path target temperature.

Accordingly, since the gas flow path temperature is appropriately controlled while suppressing an overshoot and an undershoot even when a gas flow rate fluctuates, the gas flow path temperature less readily deviates from the permissible range described earlier and a restriction on the gas flow rate attributable to temperature management is reduced.

Second Embodiment

Figure 6:
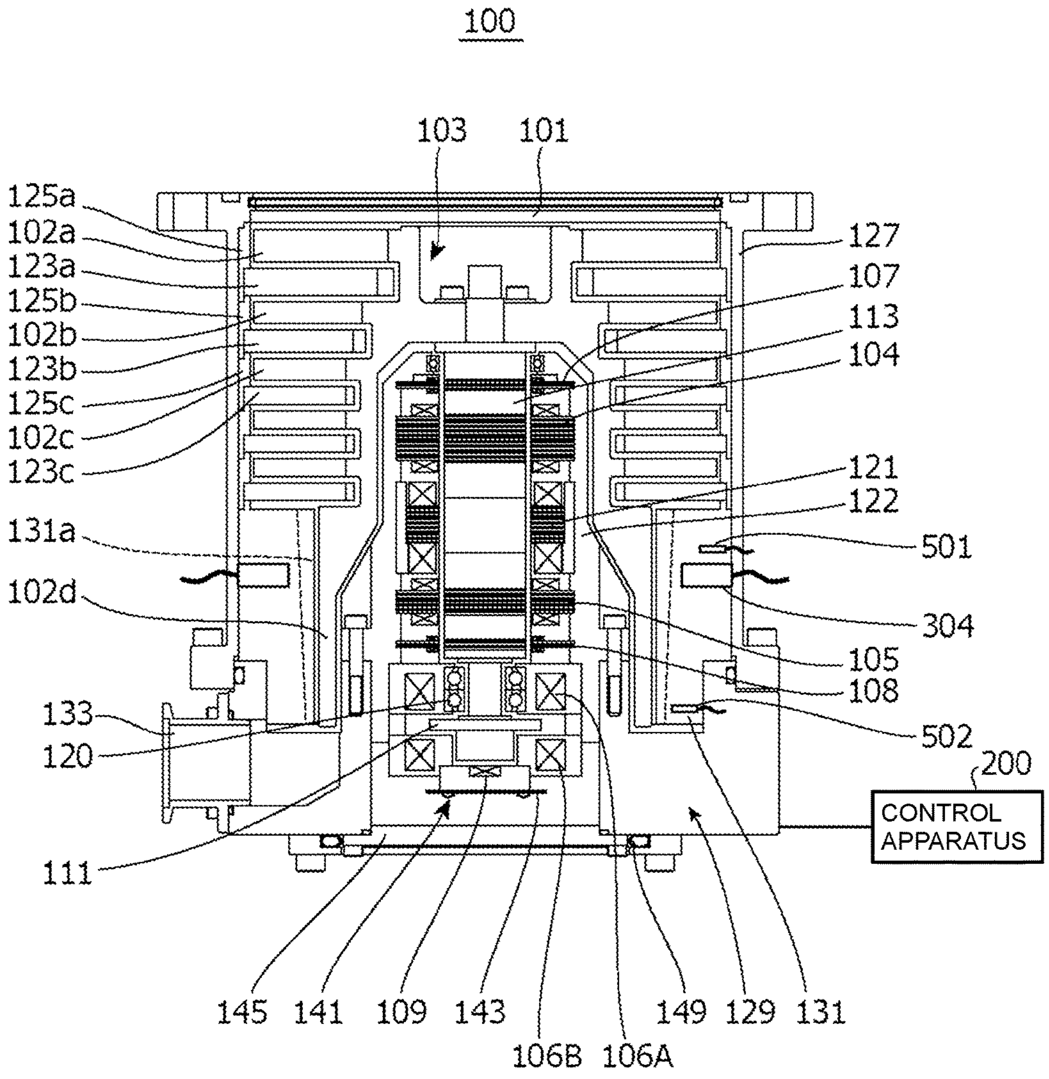
FIG. 6 is a vertical sectional view showing a turbo-molecular pump as a vacuum pump according to a second embodiment.

FIG. 6 is a vertical sectional view showing a turbomolecular pump as a vacuum pump according to a second embodiment.

In the second embodiment, the heater 304 as well as temperature sensors 501 and 502 are installed on the threaded spacer 131.

The temperature sensor 501 is installed at a position closer to the heater 304 than a gas flow path position on which temperature adjustment is to be performed, and the temperature sensor 502 is installed at a position closer to the gas flow path than the heater 304.

In addition, when a gas load (gas flow rate) increases, the actual gas flow path temperature rises and the measured temperature (gas flow path measured temperature) of the temperature sensor 401 also rises. Therefore, the control apparatus 200 lowers the control temperature set value of the heater 304 (in other words, the heating target temperature) by a drop amount corresponding to a rise amount of the measured temperature.

On the other hand, when the gas load (gas flow rate) decreases, the actual gas flow path temperature drops and the measured temperature (gas flow path measured temperature) of the temperature sensor 401 also drops. Therefore, the control apparatus 200 raises the control temperature set value of the heater 304 (in other words, the heating target temperature) by a rise amount corresponding to a drop amount of the measured temperature.

By using the two temperature sensors 501 and 502 in this manner, the gas flow path temperature is adjusted with a small temperature error so as to follow a fluctuation of a gas load (a gas flow rate).

Since other components and operations of the vacuum pump according to the second embodiment are similar to those of the first embodiment, a description thereof will be omitted.

As described above, according to the second embodiment, since using the two temperature sensors 501 and 502 corresponding to the heater 304 as a temperature adjusting means causes the gas flow path temperature to be appropriately controlled while suppressing an overshoot and an undershoot even when a gas flow rate fluctuates in a similar manner to the first embodiment, the gas flow path temperature less readily deviates from the permissible range described earlier and a restriction on the gas flow rate attributable to temperature management is reduced.

It should be understood that various changes and modifications to the preferred embodiments described above will become apparent to those skilled in the art. Such changes and modifications may be made without departing from the spirit and scope of the present invention and without diminishing its intended advantages. Accordingly, such changes and modifications are intended to be encompassed by the appended claims.

For example, in the first embodiment, two temperature sensors 501 and 502 may be provided with respect to the heater 304 and the heater 304 may be controlled based on sensor signals of the temperature sensors 501 and 502 in a similar manner to the second embodiment.

For example, the present invention is applicable to a vacuum pump.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum pump which exhausts gas sucked in by a rotation of a rotor, the vacuum pump comprising:

a temperature adjuster which performs temperature adjustment of a gas flow path;

a first temperature sensor arranged at a position closer to the gas flow path than the temperature adjuster;

a second temperature sensor arranged at a position closer to the temperature adjuster than the gas flow path; and a control apparatus which controls the temperature adjuster based on a sensor signal of the first temperature sensor and a sensor signal of the second temperature sensor so that a temperature of the gas flow path approaches a predetermined gas flow path target temperature, wherein the control apparatus modifies, in accordance with a change in a measured temperature based on the sensor signal of the first temperature sensor, a control temperature set value being a target temperature of the temperature adjuster in an opposite direction to a direction of the change in the measured temperature.

2. The vacuum pump according to claim 1, wherein the control apparatus: controls the temperature adjuster so that a measured temperature based on a sensor signal of the second temperature sensor approaches the control temperature set value to cause a temperature of the gas flow path to approach a predetermined gas flow path target temperature.

* * * * *